July 3, 1962

H. W. WELSH 3,042,367

FLUID SEAL

Filed July 17, 1958

INVENTOR.
Harvey W. Welsh
BY
Paul Fitzpatrick
ATTORNEY

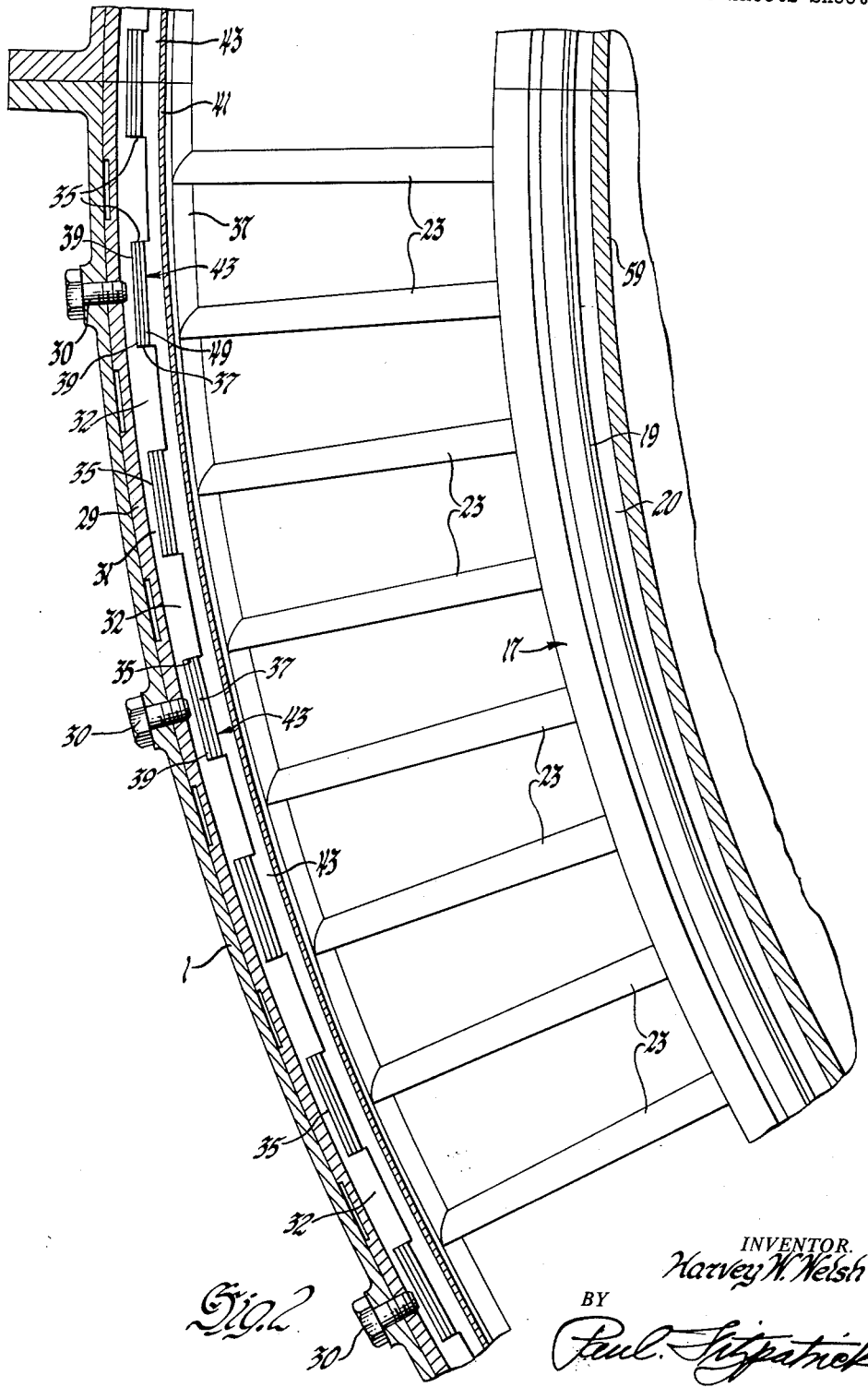

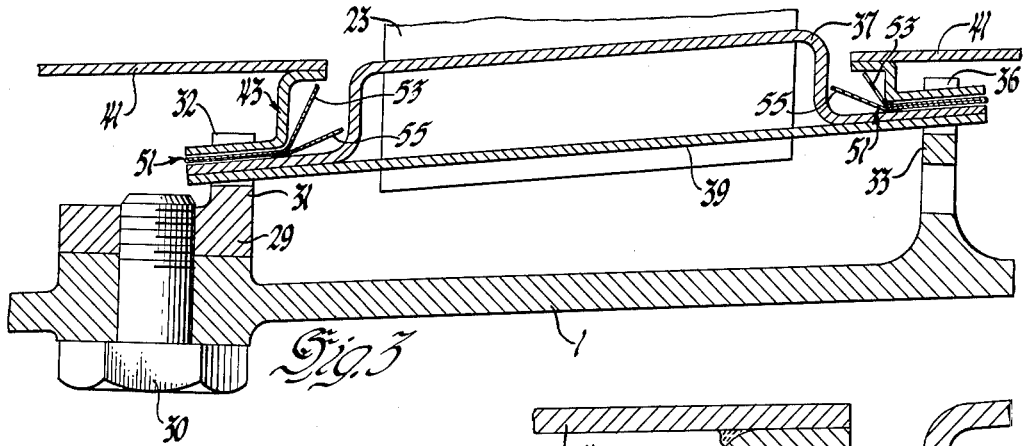
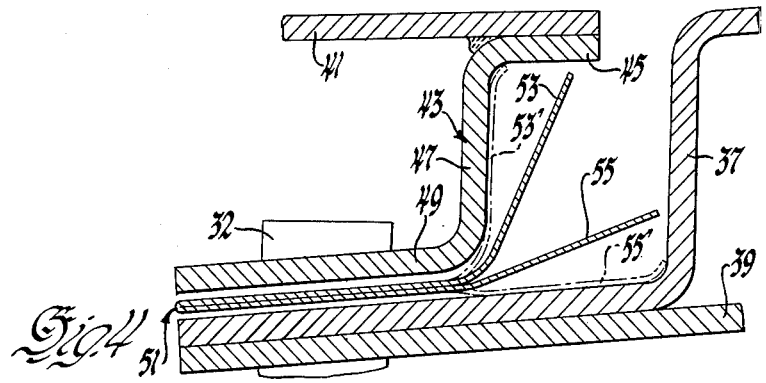
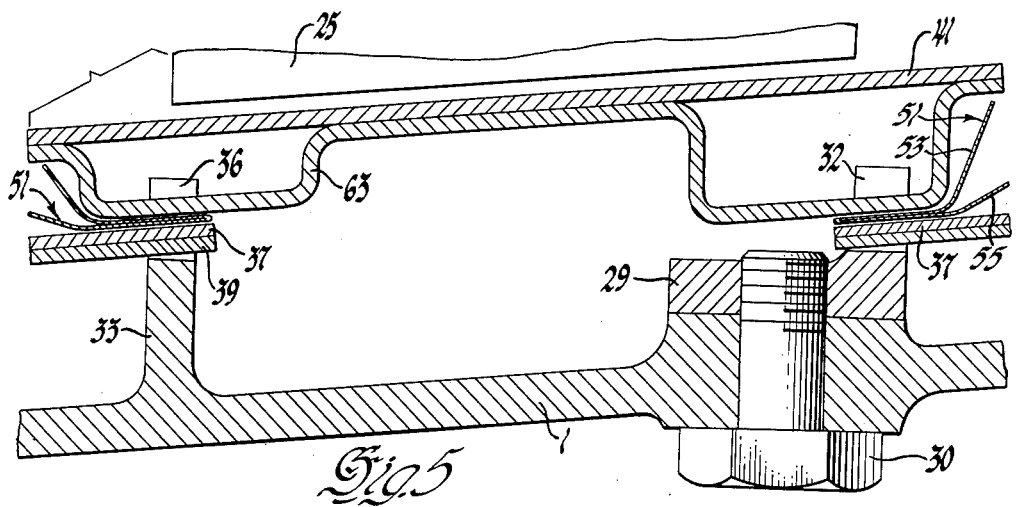

3,042,367
FLUID SEAL

Harvey W. Welsh, Indianapolis, Ind., assignor to General Motors Corporation, Detroit, Mich., a corporation of Delaware
Filed July 17, 1958, Ser. No. 749,297
2 Claims. (Cl. 253—69)

This invention relates to sealing devices and more particularly to a seal between two relatively movable elements in an elastic fluid machine.

Due to the rather large changes in the temperatures of certain parts in elastic fluid machines such as those that occur in shroud rings and vane supports in elastic fluid compressors and turbines, it is desirable to allow thermal expansion of and between these parts. Where movement caused by such expansion is permitted, it is desirable that a seal be provided between the relatively movable parts to prevent leakage of gases between the parts.

It is therefore an object of the invention to provide a simple effective sealing means between two relatively movable parts.

A further object is to provide a flexible fluid seal between two relatively movable parts of an elastic fluid machine.

It is still a further object to provide a simple, easily constructed, flexible seal between two relatively non-rotatable but radially movable elements in an elastic fluid machine.

These and other objects and advantages will be readily apparent from the following description and drawings which illustrate the application of the invention to an axial flow compressor and in which:

FIGURE 2 is a sectional view taken on the line 2—2 of FIGURE 1.

FIGURE 3 is an enlarged view of a portion of FIGURE 1 showing the seal.

FIGURE 4 is a still further enlargement of the sealing means shown in FIGURES 1 and 3.

FIGURE 5 is an enlarged view similar to FIGURE 3 showing a modification thereof.

Figure 1:
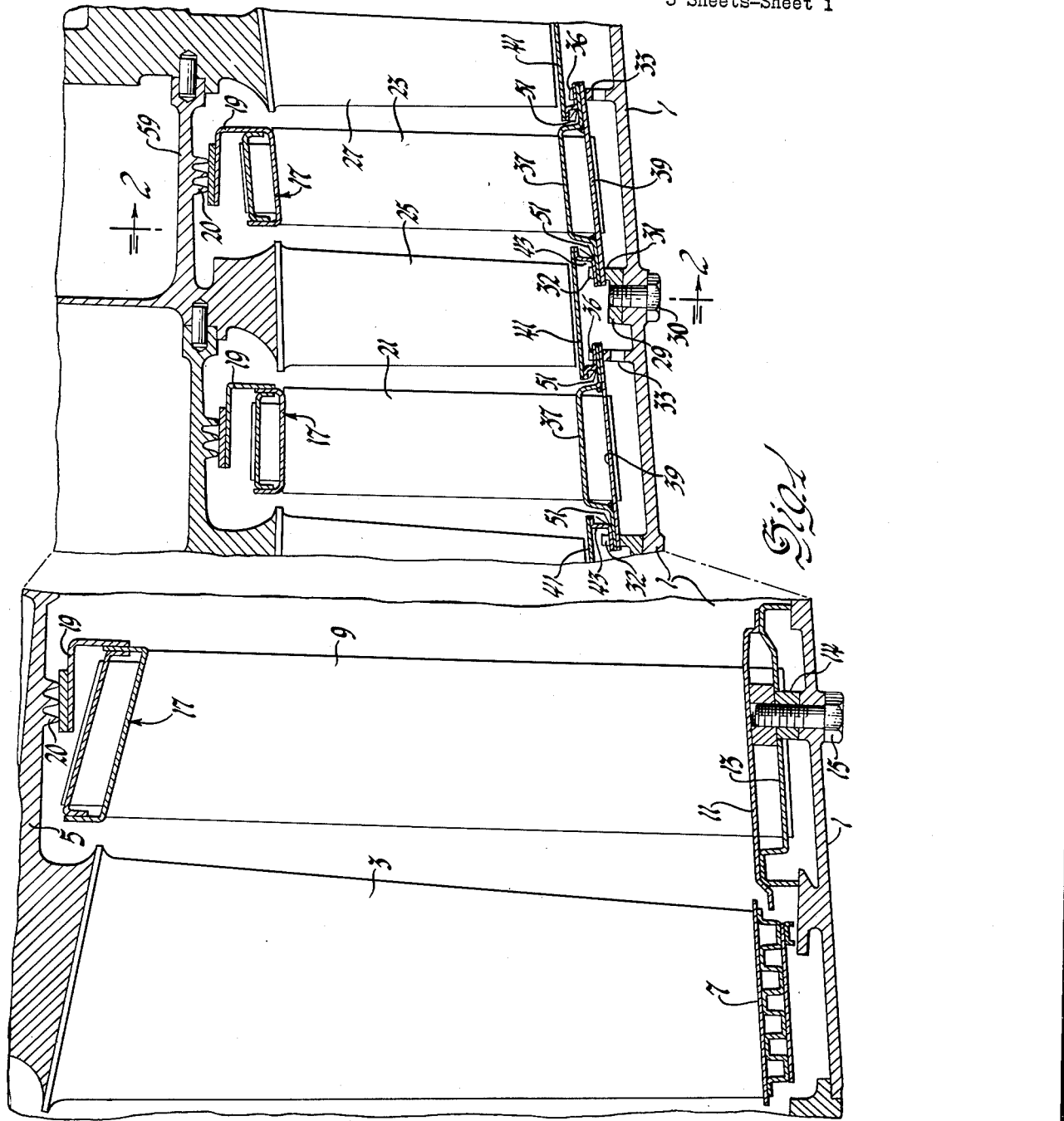
FIGURE 1 is a cross-sectional view of certain portions of an axial flow gas compressor.

The invention as illustrated generally involves the use of a flexible thin metal sheet folded in two and having its folded edge located intermediate two relatively movable parts, in the illustrated embodiment these parts being a rotor blade shroud ring and a stator vane shroud and support means. The folded sheet has its free edges or ends extending out from between the two relatively movable parts and bent to form a space therebetween that is exposed to the pressure of gases flowing between the rotor blades and the stator vanes. This pressure acts to force the free ends of the folded sheet against the two parts, the folded sheet then forming a continuous gas seal between the movable parts.

Referring now to FIGURE 1, the first low pressure stage and several higher pressure stages of alternate rows of stator vanes and rotor blades of an axial flow gas compressor are shown enclosed in an outer case member 1. The first stage rotor blades 3 are attached to a rotor wheel 5 and have an outer hollow internally corrugated shroud ring 7 attached to the ends of the blades. The first stage stator vanes 9 are supported at their outer ends by sheet metal rings 11 and 13 secured to the outer case member 1 by circumferentially spaced bolts 15. A spacer ring 14 provides for proper radial spacing of the stator support rings 11 and 13 and adds rigidity to the case member 1. The stator vanes 9 are connected at their inner ends to a hollow sheet metal shroud ring 17. The ring 17 carries a stationary seal member 19 that co-operates with ridges 20 formed on the rotor wheel 5 to form a gas seal.

FIGURE 1 also shows several of the later downstream compression stages including stator vanes 21 and 23 and rotor blades 25 and 27. In these later stages the rotor blade shrouds for each row are not integral with and rotatable with the rotor blades but are non-rotatably fixed to the case member 1 as are the stator vane supporting and shrouding rings. A ring 29 is held by circumferentially spaced bolts 30 inside the case member 1. The ring 29 has a radially extending flange 31 having circumferentially spaced slots 35 formed on the inner diameter thereof. These slots form radial projections 32 therebetween.

The case member 1 also has axially spaced radially projecting flanges 33 with circumferentially spaced slots formed on the inner diameter of the flanges 33 to form radial projections 36 therebetween. The stator vanes 21 and 23 are supported by having their outer ends passing through a hollow shroud ring formed of sheet metal rings 37 and 39 brazed or otherwise fastened together at their ends. The vanes 21 and 23 are brazed or otherwise secured to the rings. Rings 37 and 39 have circumferentially spaced slots which receive the flanges or projections 32 and 36. This construction prevents rotational movement of the rings 37 and, hence, stator vanes 23 relative to the case member 1 but permits thermal expansion and axial alignment of the stator vane assembly relative to the case member 1. The stator vanes 21 and 23 are secured at their inner ends to shroud rings 17 that carry stationary seal rings 19 similar to that of the first stage shroud vane assembly.

Each row of rotor blades has a fixed sheet metal shroud ring 41. These rings 41 are secured to an S-shaped annular ring 43 having an axially extending portion 45 brazed or otherwise secured to the ring 41, an intermediate radially extending portion 47 and a circumferentially slotted axial portion 49. The slots in the axial portion 49 have the same spacing and dimensions as those in the stator vane support rings 37 and 39 and receive the projections 32 and 36 on flanges 31 and 33. Therefore, the shroud rings 41 are fixed against rotation relative to the case member 1 but can expand radially.

A seal member 51 is provided to prevent high pressure gases from leaking between the rotor shroud rings and the stator support rings since these rings can move radially relative to each other and to the case member 1. The seal is shown with exaggerated thickness in FIGURES 3 and 4 for clarity. These figures also show the rings 43 and 37 well separated, whereas FIGURES 1 and 2 show the parts of normal size with zero clearance between rings 43 and 37. The seal ring 51 is formed of a ring of folded thin sheet metal such as that used for shims and spacers and which is rigid enough to support its own weight but which is thin enough to bend when subject to a force such as that exerted by gases under pressure. The seal member 51 comprising two portions 53 and 55 can be formed of a single sheet of folded material as shown in the illustrated embodiment, or it can be made of two individual sheets brazed or otherwise secured together to form a common end.

The seal 51 has the portions 53 and 55 slotted to engage the projections 32 and 36 and brazed together for a portion of their axial length to prevent leakage of gas past the slotted portion of the seal 51. Seal portions 53 and 55 are normally bent as shown in the solid line position of FIGURE 4. When the compressor is in operation, the pressure of gases flowing through the machine will act on the facing sides of the portion 53 and 55 as indicated by the arrows in FIGURE 4 to force the portions 53 and 55 into the dashed line positions 53' and 55' respectively. This provides an efficient gas seal between the rings 43 and 37 regardless of the radial clearance between these rings and therefore prevents the gases from leaking into the spaces between shroud rings 41 and the case member 1 or into the spaces between the stator support ring 39 and the case member 1 thereby ensuring that the gases will not bypass the proper compression stages of the vanes themselves.

The higher compression rotor blades 25 and 27 are attached at their inner ends to the power shaft, not shown, by any suitable means such as a rotor wheel 59. This power shaft may be the same shaft as that connected to the first stage rotor blade 3 or it may be a separate shaft as in a multiple spool gas turbine engine.

FIGURE 5 shows an alternative arrangement wherein the rotor shroud ring 41 is supported by a single formed sheet metal ring member 63 having circumferentially spaced slots to receive the projections 32 and 36. A pair of sealing members 51 are interposed between the rings 63 and the stator support rings 37 in the same manner as the embodiment shown in FIGURES 1 through 4.

Assembly of each stage of vanes is easily made by engaging the opposite slotted edges of adjacent rotor and stator shrouds 41 and 37 with the projections 36 on the integral flanges 33. The ring 29 is then axially moved so that projections 32 on the ring 29 engage the common slotted edge of the rings 41 and 37 and then fastened by bolts 30 to the case 1.

The invention provides a simply constructed, easily installed, inexpensive sealing means that functions as an efficient gas seal between two movable parts and is especially suitable for use in elastic fluid machines where thermal expansion causes adjacent parts to move relative to each other. It will be apparent to those skilled in the art that changes and modifications may be made without departing from the scope of the invention which is limited only by the following claims.

What is claimed is:

1. In an axial flow elastic fluid machine having alternate stator vanes and rotor blades, an axially extending outer case member surrounding said vanes and blades, a shroud ring surrounding said rotor blades, said shroud ring having a main axially extending shroud portion adjacent the outer ends of said rotor blades and having axially extending circumferentially spaced portions intermediate said main portion and said case member, a stator support ring surrounding and supporting said stator vanes, said support ring having axially extending circumferentially spaced portions radially spaced from and axially overlapping the spaced portions on said shroud ring, a radially extending circumferential flange on the inside of said case member, circumferentially spaced slots in said flange receiving said circumferentially spaced portions on said shroud ring and said support ring to prevent rotation of said rings relative to said case member but permitting radial movement of said rings relative to each other and said case member, and a flexible seal between said shroud ring and said support ring for preventing leakage of gases flowing between said vanes and blades into the space between said rings and said case member.

2. The elastic fluid machine of claim 1 wherein said flexible seal comprises a pair of flexible sheets having a common end located between said shroud ring and said support ring and having spaced free ends exposed to the fluid passing between said vanes and blades, said fluid acting between said sheets to force the free ends respectively against said shroud ring and against said support ring.

References Cited in the file of this patent
UNITED STATES PATENTS

| | | |
|---|---|---|
| 696,867 | Fullagar | Apr. 1, 1902 |
| 2,282,894 | Sheldon | May 12, 1942 |
| 2,314,289 | Salisbury | Mar. 16, 1943 |
| 2,427,244 | Warner | Sept. 9, 1947 |
| 2,858,104 | Kelk et al. | Oct. 28, 1958 |

OTHER REFERENCES

Product Engineering, June 1951 (pages 131–135).